Sept. 20, 1932.  W. J. HILD  1,877,869
SICKLE GUARD AND BAR
Filed May 13, 1930   2 Sheets-Sheet 1

Inventor
William J. Hild
By Vernon E. Hodges
his Attorney

Sept. 20, 1932.  W. J. HILD  1,877,869
SICKLE GUARD AND BAR
Filed May 13, 1930  2 Sheets-Sheet 2
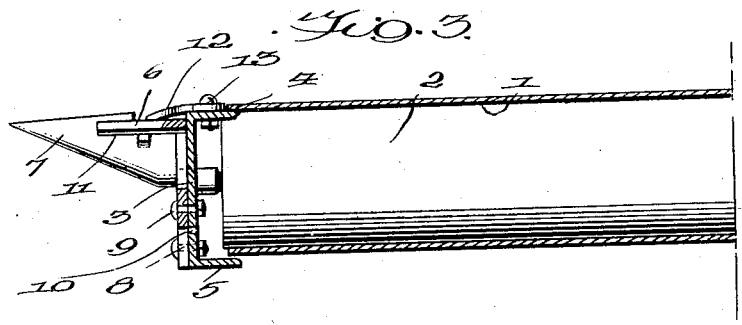
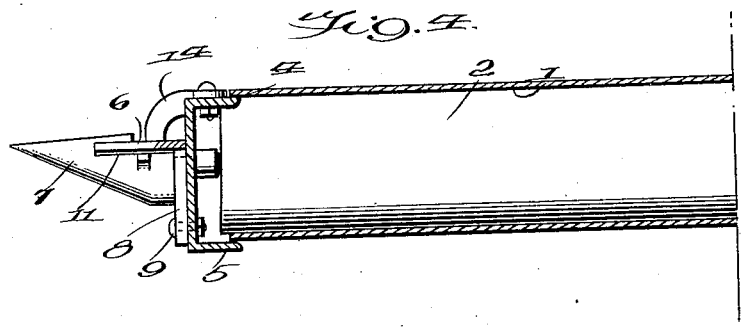
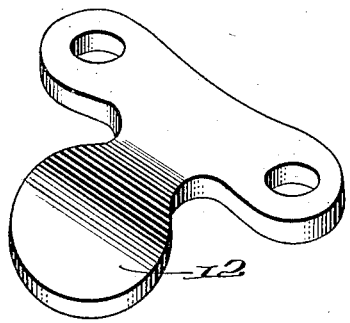
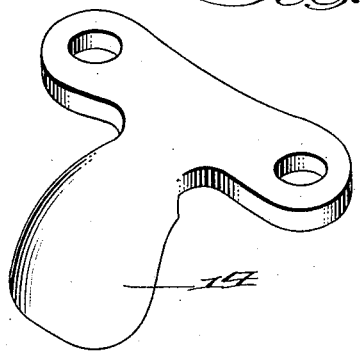
William J. Hild, Inventor
By Vernon E. Hodges, his Attorney Patented Sept. 20, 1932

1,877,869

UNITED STATES PATENT OFFICE

WILLIAM J. HILD, OF PEKIN, ILLINOIS

SICKLE GUARD AND BAR

Application filed May 13, 1930. Serial No. 452,076.

This invention relates to an improvement in sickle guards, particularly for harvesters or the like that are provided with a canvas or conveyor associated with the finger bar of the machine.

The object of the invention is to raise the cutting knives attached to the sickle bar to the level of the table canvas or conveyor to prevent waste, particularly in the cutting of short grain. Provision is also made to adjust the height of the sickle bar and guards to permit the cutting at different heights, although it is primarily intended that the sickle bar should be held in the elevated position approximately at the height or horizontal level of the canvas or conveyor.

In the accompanying drawings:

Fig. 1 is a partial top plan view showing the application of the invention to a portion of a harvester or the like;

Fig. 3 is a transverse sectional view through the finger bar, showing the sickle bar raised to its elevated position;

Fig. 4 is a similar view with the bar in its lowered position;

Fig. 5 is a detached perspective view of one of the guides for the sickle bar, to be used when the latter is in its raised position; and Fig. 6 is a similar view of a guide to be used in the lowered position.

Figure 1:
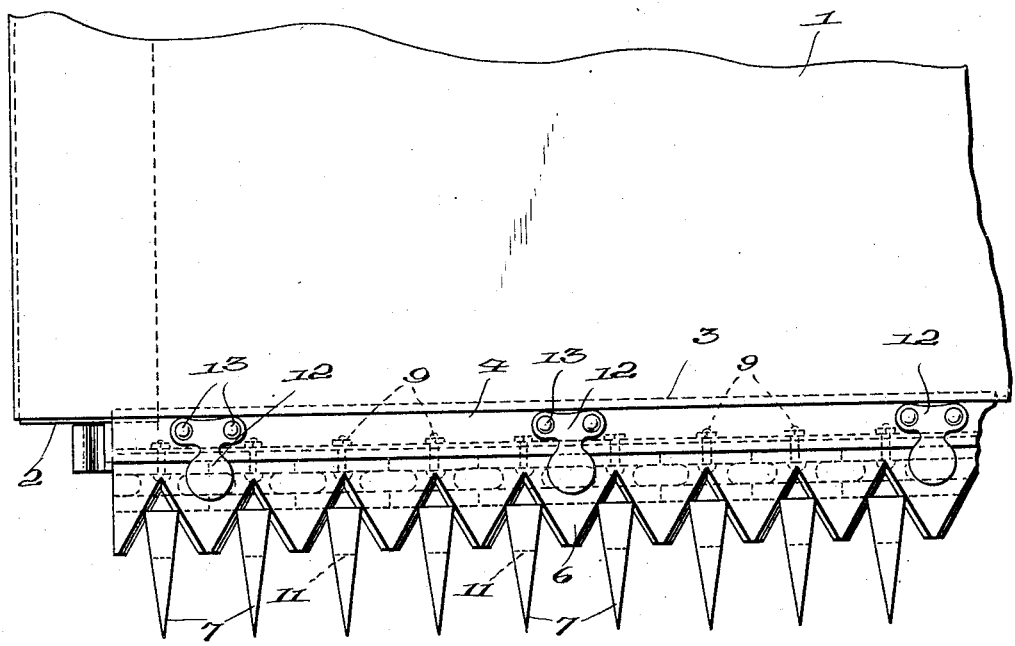
Figure 2:
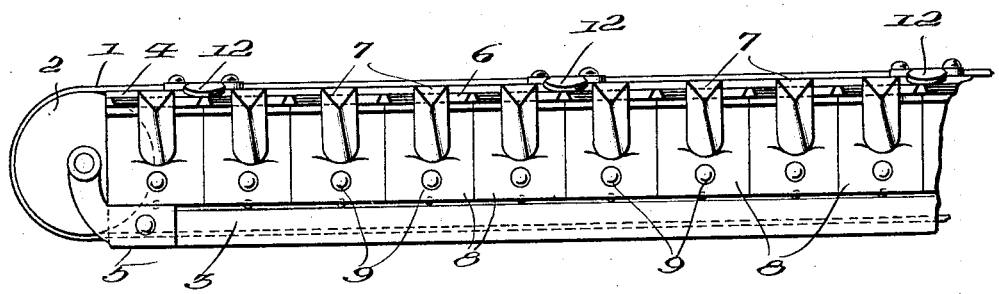
Fig. 2 is a front elevation of the same.

The canvas or conveyor for a harvester or the like is designated generally by the numeral 1 and passes over the usual rollers 2, so as to convey the cut grain away from the finger bar and sickle.

As shown in Figs. 3 and 4, the conveyor canvas 1 is associated with a finger bar 3, which is of channel shape and provided with upper and lower flanges 4 and 5 respectively, turned back toward and under the upper and lower sides of the canvas or conveyor 1. The usual sickle bar for the harvester is designated by the numeral 6 and extends through guard fingers 7, which are provided with vertical flanges 8 formed on and at the back ends thereof, which abut against the finger bar 3 and are secured to the face thereof by means of bolts 9 or the like, which extend through the plates 8 and the finger bar 3.

Additional holes 10 are provided in the finger bar 3 near the lower edge thereof to permit the guard fingers and sickle bar 6 to be adjusted to the lower position, as shown in Fig. 4. Normally, however, for cutting short grain particularly, the guard fingers 7 will be arranged in the upper position with the sickle bar approximately in horizontal alignment with the top of the canvas conveyor 1, as shown in Fig. 3. The sickle bar 6 extends over and cooperates with the cutting blades 11, riveted or otherwise fixed to the upper portion of the guard fingers 7.

Guides 12 are attached by means of bolts 13 or the like to the flange 4 of the finger bar 3 and extend over the sickle bar 6, to hold the sickle bar rigid and in place in the fingers 7.

When the sickle bar and fingers are lowered to the position shown in Fig. 4, guides 14 are employed in place of the guides 12, and have the guiding portions thereof longer and extend downward approximately into contact with the upper face of the sickle bar.

This arrangement provides a secure support for the sickle bar but permitting the adjustment thereof to different heights relative to the canvas conveyor and particularly allowing its disposition approximately in the same horizontal plane as the canvas conveyor to prevent waste in the cutting of short grain.

I claim:

1. In a harvester, the combination with an endless canvas conveyor, of a finger bar associated therewith, and having openings arranged therein at different heights, guard fingers having plates arranged at the back ends thereof, means projecting outwardly from the plates and adapted to extend into the openings in the finger bar for securing the guard fingers thereto at different elevations, and a sickle bar operatively mounted in the guard fingers.

2. In a harvester, the combination with a canvas conveyor, of a finger bar associated with the conveyor and having at least two series of openings arranged longitudinally thereof at different elevations, guard fingers having plates at the back ends thereof to abut against the finger bar, means extending from the plates into one series only of the openings for securing the guard fingers to the finger bar, and being adjustable to enter the other series of openings to adjust the height of the guard fingers relative to the finger bar, and a sickle bar operatively mounted in the guard fingers.

3. In a harvester, the combination with a canvas conveyor, of a finger bar associated with the conveyor and having at least two series of openings arranged longitudinally thereof at different elevations, guard fingers having plates at the back ends thereof to abut against the finger bar, means extending from the plates into one series only of the openings for securing the guard fingers to the finger bar, and being adjustable to enter the other series of openings to adjust the height of the guard fingers relative to the finger bar, a sickle bar operatively mounted in the guard fingers, and guides secured to the finger bar and extending downwardly in overlapping relation to the sickle bar, and cooperating with the guard fingers in guiding the movement of the sickle bar.

4. In a harvester, a channel-shaped finger bar having an outwardly presented flat side, fingers projecting horizontally from the bar and substantially in horizontal alignment with the top thereof, each of said fingers having a downwardly extending flange fixed thereto, and supporting means for the fingers arranged between the flanges and the flat side of the bar, said supporting means having provision for vertically adjusting the fingers to positions substantially below the top of the bar.

5. In a harvester, the combination with a canvas conveyor, of a channel-shaped finger bar having flanges underlying the upper and lower runs of the conveyor, fingers projecting horizontally from the bar and substantially in horizontal alignment with the upper run of the conveyor, each of said fingers having a vertical flange abutting against the flat side of the bar, supporting means for the fingers arranged between the finger flanges and the flat side of the bar, means cooperating with said supporting means for supporting the fingers in a position substantially below said normal position, and a sickle-bar operatively mounted in the fingers.

6. In a harvester, a channel shaped finger bar having a flat outward face, fingers projecting horizontally from the bar and substantially in horizontal alignment with the top edge thereof, each of said fingers having a downwardly extending flange carried thereby and abutting against the face of the bar, and bolts between the face of the bar and the downwardly extending flanges for securing the fingers to the bar.

In testimony whereof I affix my signature.

WILLIAM J. HILD.